R. K. LE BLOND & W. F. GROENE.
LATHE GEARING.
APPLICATION FILED JAN. 10, 1910.
1,044,545.
Patented Nov. 19, 1912.
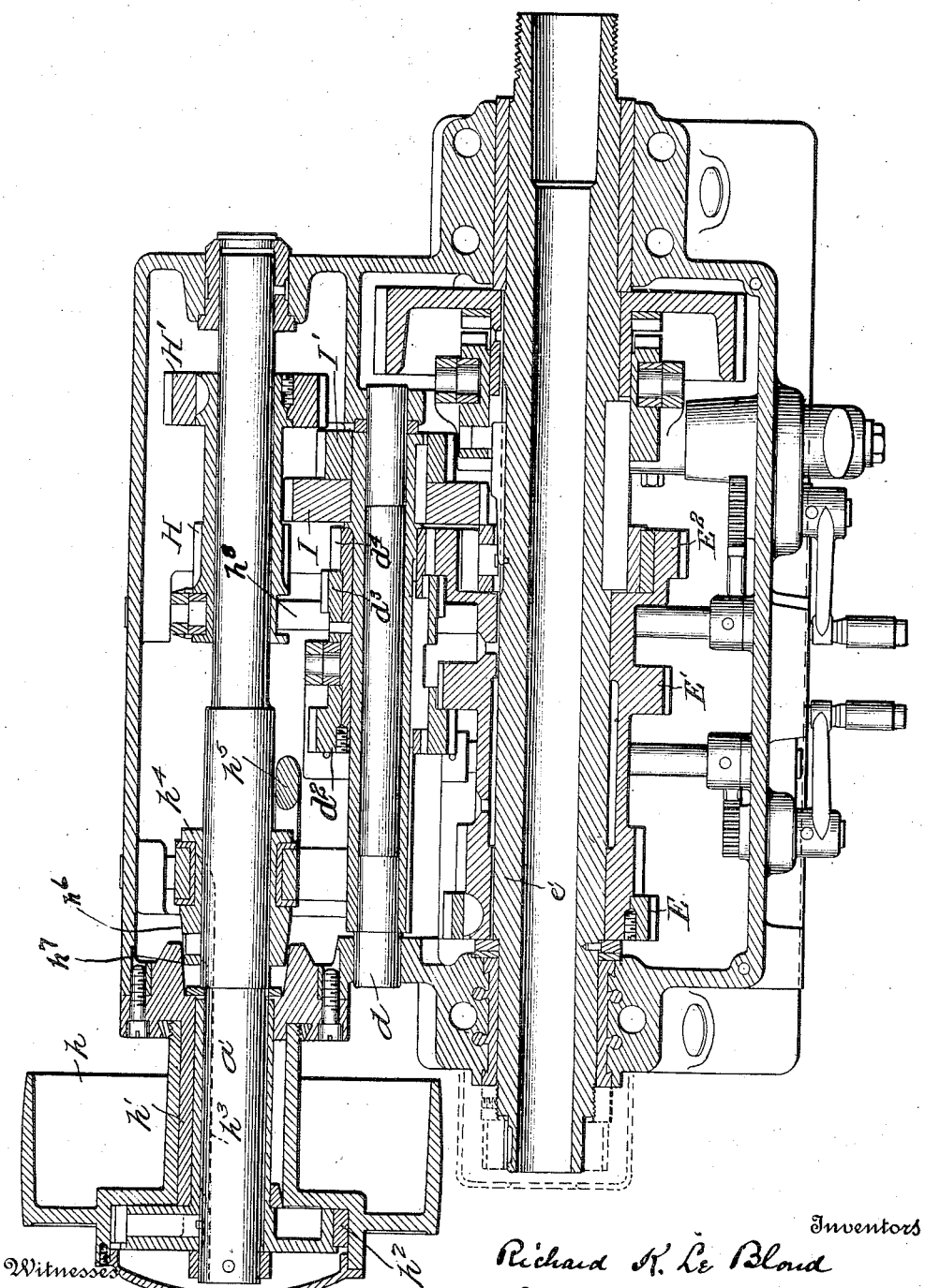
Witnesses
Inventors
Richard K. Le Blond
and W"s F. Groene
By Robt. P. Hains
Attorney

UNITED STATES PATENT OFFICE.

RICHARD K. LE BLOND AND WILLIAM F. GROENE, OF CINCINNATI, OHIO, ASSIGNORS TO R. K. LE BLOND MACHINE TOOL COMPANY, A CORPORATION OF OHIO.

LATHE-GEARING.

1,044,545.  Specification of Letters Patent.  Patented Nov. 19, 1912.

Application filed January 10, 1910. Serial No. 537,318.

*To all whom it may concern:*

Be it known that we, RICHARD K. LE BLOND and WILLIAM F. GROENE, citizens of the United States, residing at Cincinnati, in the county of Hamilton and State of Ohio, have invented certain new and useful Improvements in Lathe-Gearing, of which the following is a full, clear, and exact specification.

This invention relates to certain new and useful improvements in lathes.

The invention has for its object the production of an improved constant speed driven head in which the speed changes can be instantly obtained.

A further object is the production of a lathe head provided with improved mechanism whereby, particularly upon use in heavy work, the starting and stopping of the mechanism is readily accomplished.

The invention will be hereinafter fully set forth and particularly pointed out in the claims at the end of the description.

The accompanying drawing is a horizontal sectional view illustrating one form of our invention.

The lathe head of our invention is particularly adapted for heavy work and in the drawing $h$ indicates the driving pulley mounted on a bushing $h'$ fastened to the main frame, said bushing also serving as a bearing for the driving shaft $a'$. The said shaft $a'$ is driven by means of a clutch $h^2$ operated by a sliding key $h^3$ through the yoke $h^4$ and handle $h^5$. The yoke $h^4$ is provided with a cone bushing $h^6$. By this arrangement when the yoke $h^4$ is shifted to release clutch $h^2$ the cone $h^6$ engages the face $h^7$, whereupon rotation of the head will be immediately arrested. On the shaft $a'$ are mounted the slidable gears H, H', both on the same quill and arranged with a suitable yoke $h^8$ for sliding on said shaft.

Adjacent the shaft $a'$ is a second shaft $d$ provided with two gears I, I', the gear H meshing with the gear I when the sliding gears are in one position and the gear H' meshing with the gear I' in the other position.

$e'$ indicates the main spindle and for transmitting power thereto any preferred form of mechanism may be employed in connection with the mechanism above described. As shown in the drawing, sliding gears $d^2$, $d^3$, $d^4$ are mounted on the shaft $d$ and are so arranged that they will take the speed of gear I when the mechanism is driven through gear H and the speed of I' when driven through gear H'. These gears $d^2$, $d^3$, $d^4$ may be made in one integral piece or else keyed together to revolve as a single unit. Mounted on the main spindle $e'$ are gears E, E', E², the gear E meshing with the gear $d^2$, the gear E' with the gear $d^3$, and the gear E² with the gear $d^4$. The gear E² may be provided with any suitable clutch mechanism whereby said gear may be geared to the main spindle $e'$ and thereby transmit power to the spindle for the various spindle speeds.

From the foregoing it will be seen that power will be transmitted from either gear H or H' to gear I or I' and to the gears $d^2$, $d^3$, $d^4$, which in turn transmit power through the gears E, E', E².

Having thus fully described our invention, what we claim as new and desire to secure by Letters Patent of the United States, is:—

1. In combination a driving shaft, a bushing through which said shaft is passed, a clutch controlling the operation of said driving shaft, an operating member for said clutch extending through said bushing, a brake member coöperating with one end of said bushing for arresting movement of said shaft, and means for operating said clutch and brake in unison.

2. In combination a driving shaft, a bushing through which said shaft is passed, a clutch controlling the operation of said driving shaft, an operating member for said clutch extending through said bushing a brake member coöperating with one end of said bushing for arresting movement of said shaft, a yoke, means for operating said yoke, and connections between said yoke and said clutch operating member and between the yoke and said brake, whereby the brake and clutch are operated in unison.

In testimony whereof we have signed our names to this specification in the presence of two witnesses.

RICHARD K. LE BLOND.
WILLIAM F. GROENE.

Witnesses:
EDWARD G. SCHULTZ,
GRACE PUGH.